United States Patent
Lin et al.

(10) Patent No.: US 7,254,405 B2
(45) Date of Patent: Aug. 7, 2007

(54) SYSTEM AND METHOD FOR PROVIDING LOCATION INFORMATION TO APPLICATIONS

(75) Inventors: Peter A. Lin, Lisle, IL (US); Patrick M. Maurer, Wayland, MA (US); Patrick D. Smith, Deerfield, IL (US); Narayanan Venkitaraman, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 73 days.

(21) Appl. No.: 11/073,532

(22) Filed: Mar. 7, 2005

(65) Prior Publication Data

US 2006/0121913 A1    Jun. 8, 2006

Related U.S. Application Data

(60) Provisional application No. 60/630,106, filed on Nov. 22, 2004.

(51) Int. Cl.
*H04Q 7/20*    (2006.01)

(52) U.S. Cl. ............................. 455/456.1; 455/456.2; 455/456.3; 455/456.5; 455/456.6; 455/422.1

(58) Field of Classification Search ............. 455/456.1, 455/456.2, 456.3, 456.5, 456.6, 422.1
See application file for complete search history.

(56) References Cited

U.S. PATENT DOCUMENTS

| | | |
|---|---|---|
| 6,421,716 B1 | 7/2002 | Eldridge et al. |
| 2004/0008138 A1* | 1/2004 | Hockley et al. ........ 342/357.09 |
| 2004/0264414 A1 | 12/2004 | Dorenbosch |
| 2005/0002407 A1* | 1/2005 | Shaheen et al. ............ 370/401 |
| 2006/0019679 A1* | 1/2006 | Rappaport et al. ....... 455/456.5 |

OTHER PUBLICATIONS

Telenity Corporate Fact Sheet brochure, undated, 2 pages.

* cited by examiner

*Primary Examiner*—Joseph Feild
*Assistant Examiner*—Khai Nguyen (57) ABSTRACT

First location information related to a location-aware device (514) is gathered. Second location information for a location-unaware device (520) is determined from the first location information. A data structure is created comprising a binding of the second location information and an identifying parameter of the location-unaware device (520). The data structure is provided in a form usable by an application.

9 Claims, 7 Drawing Sheets

SYSTEM AND METHOD FOR PROVIDING LOCATION INFORMATION TO APPLICATIONS

CROSS REFERENCES TO RELATED APPLICATIONS

This application claims the benefit of U.S. Provisional Application No. 60/630,106 filed on Nov. 22, 2004 which is incorporated herein by reference in its entirety.

FIELD OF THE INVENTION

The field of the invention relates to communication networks, data networks, or sensor networks and, more specifically, to determining locations or adjacency of entities within or outside of these networks.

BACKGROUND OF THE INVENTION

In communication networks, the location of a user or user device is often needed to perform a function. For instance, alerts or other types of information may need to be delivered to a user. Location-aware devices facilitate these applications by being able to provide location-related information to applications. On the other hand, location-unaware devices are not provided with this functionality.

In previous communication networks, location information gathering, storage, and usage were network, device, or application specific. Specifically, after the information had been gathered, the information was usually stored in a non-uniform format depending upon the device or network type. Furthermore, applications used within one type of network were not portable to another type of network. Consequently, location information gathered in one network, from one type of device, or from disparate applications was not useable in another network, at a different type of device, or among different applications.

In addition, devices operating in previous systems relied upon the networks to provide location information. However, previous networks were not configured to provide location information because of technical or configuration management issues. For example, in WLAN networks, WLAN Access Points were often too high in number to manually configure and maintain the location of each access point. Similarly, for sensor networks, the sensors had very little processing power and memory and were also high in numbers.

In one example of these problems, a cellular network could determine and store the location of a multi-mode handset of a user. Subsequently, the user (with the multi mode handset) might move from the cellular network to a Wireless Local Area Network (WLAN). However, in previous systems, the user location information ceased to remain available or accurate when the handset switched from the cellular network to the WLAN. Even if the information was of a different type or were to remain available, the location information from the cellular network was stored in a different format than that required by devices operating in the WLAN. Consequently, location based service (LBS) applications that required accurate and available location data became inoperative or produced erroneous results. In addition, LBS applications operating in the cellular network could not operate in the WLAN.

Some previous systems attempted to resolve the above-mentioned problems by allowing for the manual modification of device configurations by a user. In such systems, a user would manually reconfigure their equipment to operate within a particular network, device, or application and change this configuration as needed. However, this manual reconfiguration process was expensive, time-consuming, and prone to user errors. Even after manual reconfiguration, location information remained in one domain (e.g., a particular network) and was not transportable across domains. Furthermore, no domain-independent application query mechanism existed that was standardized across all network types to determine a location of the user.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method for determining and maintaining location information for network users gathers location information from location-aware devices, derives information for location-unaware devices, and stores the results in a data structure that is dynamically updated. In one example, the data structure and the information contained therein are stored and made available to devices and applications independently of their type or association with an underlying network.

In many of these embodiments, first location information related to a location-aware device (e.g., a handset) is first gathered. Second location information for a location-unaware device (e.g., a network access point in a location-unaware network) is determined from the first location information. Such devices may be client devices, edge network devices, or devices residing at the network core. A data structure is created comprising a binding of the second location information and an identifying parameter associated with the location-unaware device. In one example, the data structure is provided in a form usable by an application irrespective of the type of the underlying network associated with the application and irrespective of the device type, device identity, or user identity associated with the location-aware device or the location-unaware device.

In still others of these embodiments, the second location information is refreshed or updated based upon subsequent location information gathered about the same location-aware device or other location-aware devices as these devices move between a first network and a second network, for instance, between a cellular network and a Wireless Local Area Network (WLAN). In another example, the second location information in the data structure is preserved as the location-aware device, at some other time, becomes associated with and begins operating a third device (e.g., another WLAN access point).

In yet others of these embodiments, first location information related to a first device in a location-aware network is gathered. Second location information is determined for a second device in a location-unaware network from the first location information.

In additional ones of these embodiments, the second location information that is computed is used to determine location information for other devices. Additionally, in some of these embodiments, the second location information that has been computed may be updated as new information becomes available. These updates are used to refresh or refine the location information. In one example, first location information corresponding to a cell phone is used to determine the location of a location-unaware access point. The cell phone immediately gets into radio contact with an RFID whose location is known more accurately than the location of the cell phone. The RFID location is another measurement usable in determining the location of the WLAN access point, and, accordingly, the location of the WLAN access point is updated by refining the previous WLAN access point location with the new location information. It will be appreciated that the association between the WLAN access point and the RFID location is implied even if the cell phone is serially, rather than simultaneously, connected to both the RFID and the WLAN access point.

The determination may be based upon a real/direct, indirect, or implied association between the first device and the second device. In one example, a real association is formed between a multimode handset and an access point when the multimode handset, with location awareness in at least one of its modes, registers with the WLAN access point for data access. In a direct association, the first and second devices are in physical contact, by way of electrical, radio or other physical connections requiring a degree of proximity. Such physical contact may be for some other purpose than for determining proximity. Rather, the physical contact may be for the purpose of exchanging data between the first and second devices.

In another example, an indirect association between the handset and a printer may be determined, if, using the proceeding example, a printer is on the same sub-network as the WLAN access point. In an indirect association, the first and the second devices are not in direct physical contact, but both the first and second device have made a direct association with a common intermediate device or network.

In another example, an implied association may be formed between a multimode or single-mode handset currently registered with a cellular base station and a laptop computer (currently connected to the Internet), when the handset and computer belong to the same user. In an implied association, there may be no direct association between the first and second devices, but the first and second devices share some common attribute, such as ownership, that implies proximity.

Thus, approaches are provided that allow location features of one network to be used in another network. User location information is transported across devices and networks even when the user is operating across disparate networks and using different devices. Moreover, location applications are able to operate over multiple networks and with devices having various degrees of location awareness. In addition, location information can be gathered using client devices, but can be maintained relating to edge or access devices, which are less identified with an end user, thereby providing anonymous location information gathering. Furthermore, location information can be obtained by end-users without giving away their identities to untrusted parties.

Figure 1:
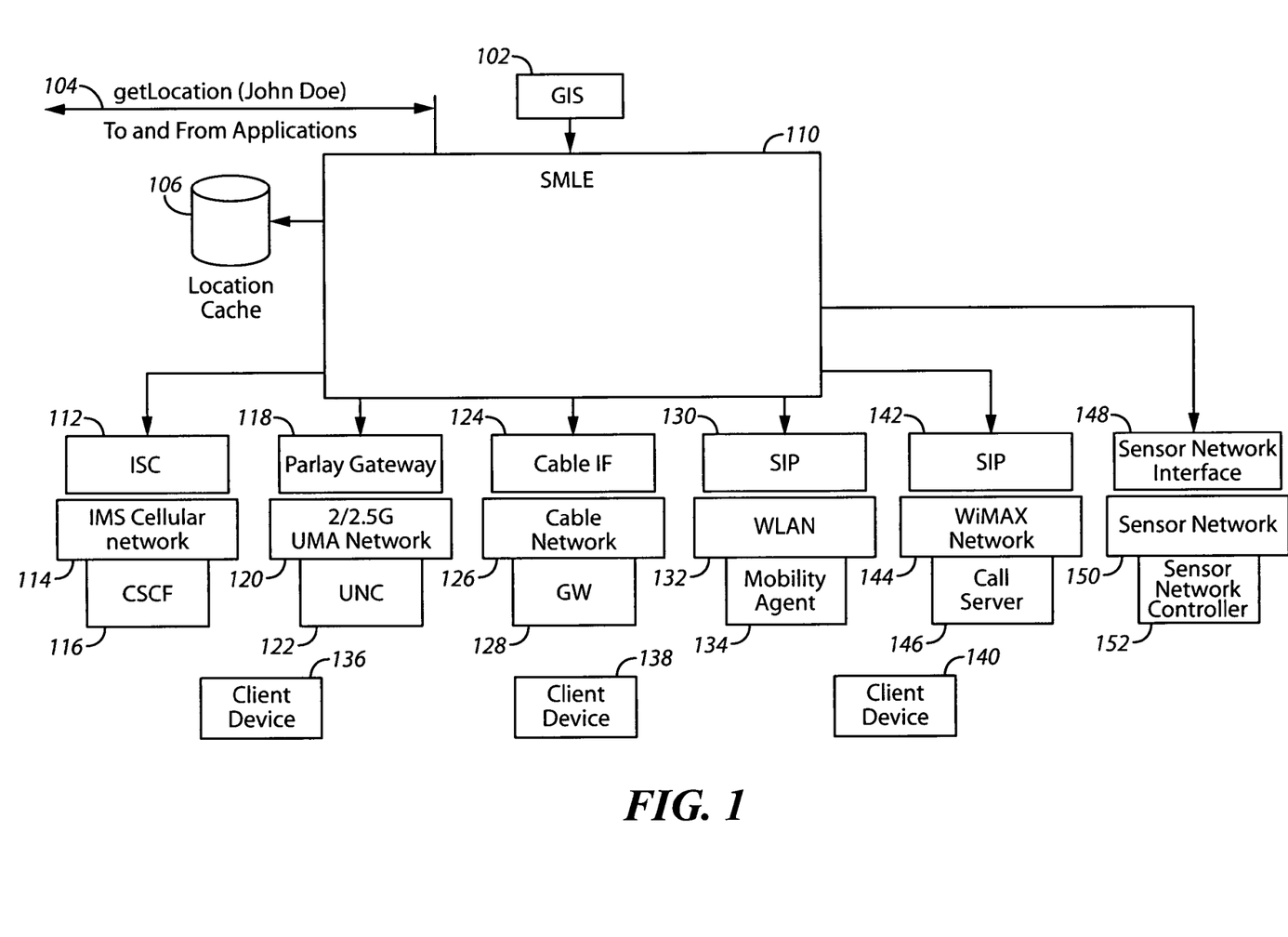
FIG. 1 is a block diagram of system for providing and maintaining location information to applications according to the present invention.

Referring now to FIG. 1, one example of a system for providing location information to applications is described. A Seamless Measurement of Location Entity (SMLE) 110 is coupled to a Geographic Information Systems (GIS) function 102. The GIS function 102 may provide services such as location mapping to the SMLE 110. Applications are connected to a communication channel 104, which is used to interface to the SMLE 110. These applications may reside in a wide range of equipment, such as a server, end user device, or some other combination as is known in the art. These applications may request and obtain location information concerning a user by issuing an Application Program Interface (API) command (e.g., getLocation(user)) to the SMLE 110 via the channel 104 and receiving a response from the SMLE 110. In the opposite direction, appropriate triggers may also be sent to applications via the channel 104 based upon a call back request received at the SMLE 110.

The SMLE 110 also accesses a location cache 106, which is used to store location-related data of client devices 136, 138, and 140. The cache 106 may be any type of temporary or permanent memory storage device. The data structure stored in the cache 106 is preferably a binding where the gathered or derived location information is linked with device identifying parameters. In addition, in some examples, the data structure in the cache 106 is in a form usable by an application irrespective of a network type of an underlying network associated with the application and irrespective of a device type, a device identity, and user associated with the location-aware device 136 and the location-unaware device 138.

The client devices 136, 138, and 140 may be any type of wired or wireless user or network device such as cellular phones, pagers, multi-mode devices, access points, or laptop computers. Other examples of client devices are possible. In addition, these client devices 136, 138, and 140 may be location-aware devices that are capable of providing explicit information concerning their location to other entities, or location-unaware devices that do not have this capability. In one example of a location-aware device, a multi mode device may obtain and, therefore, be aware of its Global Position System (GPS) coordinates. It will be appreciated that other types of entities can be location-aware or location-unaware, and that such entities can be parameterized by location. As such, location information can be gathered by the SMLE for them as well. Examples of such entities are access points, mobile routers, a subnet prefix, ad-hoc networks, stationary networks, or moving networks.

Furthermore, networks may be location-aware or location-unaware. In one example of location-aware networks, a network such as the IMS cellular network 114 may include equipment to resolve GPS coordinate information about base stations and handsets, and the cable network 126 may possess street address information associated with cable modems. In this case, each network 114 and 126 possesses the ability to determine some form of location information through and about devices that are in or a part of the network. Thus, the networks 114 and 126 are examples of location-aware networks for these specific types of location information respectively.

In an example of a location-unaware network, the cable network 126 when it has GPS coordinates, does not possess the ability to determine a GPS coordinate form of location of devices within the network, nor is it capable of using the GPS coordinates if given access to them. Such networks are, therefore, an example of a location-unaware network for that form of location information.

In one example, the SMLE 110 is also coupled to an Internet Protocol Multimedia Subsystem (IMS) Service Control gateway 112 (hereinafter "ISC gateway 112"), a gateway 118, a cable interface 124, and a Session Initiation Protocol (SIP) interfaces 130 and 142, and a Sensor Network Interface 148. The ISC gateway 112 provides an interface between an IMS cellular network 114 and an application server. The devices 112, 118, 124, 130, 142, and 148 each provide an interface between various types of networks to which they are connected and the SMLE 110. The networks shown in FIG. 1 are examples only and, for example may be any type of IEEE 802 network or any other type of network.

The SMLE 110 gathers location information from the different networks and processes this information into a uniform format. More specifically, a support layer may be provided in the devices 136, 138, and 140, and this layer sends location and context information to the SMLE 110 via the networks and interfaces mentioned above. The SMLE 110 processes this information and maintains consistency of the information, for example, in a uniform format. As a result, the SMLE 110 provides a consistent view of a user location to an application and decouples applications from particular types of access networks and/or devices.

The ISC 112 is coupled to IMS cellular network 114. The network 114 in turn is coupled to a Call Session Control Function (CSCF) 116. The CSCF 116 handles registration information (as a contact point with an end user device), and provides an interface to any of the client devices 136, 138, and 140. Devices 136, 138, and 140 may interface with some or all of the interfaces and a device, for example, may connect to only one interface.

The gateway 118 is coupled to the network 120. The network 120 is a 2/2.5G/Unlicensed Mobile Access (UMA) network. The network 120 is also coupled to a UMA Network Controller (UNC) interface 122. The UNC interface 122 provides accessibility between the client devices 136, 138, and 140 and the network 120.

The SIP interface 130 is coupled to the WLAN 132 and arranges sessions between entities. The WLAN 132 is also coupled to mobility manager 134. The mobility manager 134 provides an interface to the client devices 136, 138, and 140.

The SIP interface 142 is coupled to the WiMAX network 144 and arranges sessions between different entities. The WiMAX network 144 is coupled to call server 146, which provides an interface to the client devices 136, 138, and 140.

The Sensor Network Interface 148 is coupled to a sensor network 150. The sensor network 150 is coupled to a sensor network controller 152, which provides an interface to the client devices 136, 138, and 140. The sensor network interface 148 is a protocol that facilitates communication or data exchanges between a sensor network and other devices or applications such as the SMLE 110. The sensor network 150 communicates with a collection of devices for providing measurements such as proximity, temperature, or other parameters. The sensor network controller 152 is an optional device, which is conditioned to act on behalf of commands about the sensor network.

In one example of the operation of the system of FIG. 1, location information related to a location-aware device, for instance, client device 136, is gathered by the SMLE 110 and stored within the location cache 106. Location information for a location-unaware device, for instance, for client device 138, which may be a WLAN access point, may be determined from the location information from the location-aware device. For example, if the location of the location-aware device 136 is determined to be at a known point of interest (having a geographic location x, y) and the location-unaware device 138 is determined to share an association with the location-aware device 136, it can be determined that the location-unaware device 138 is located proximate to the known point of interest with geographical location (x, y). Thus, the location of the location-unaware client device 138 is determined even though the device 138 has no location determination capability or awareness of its own, or even though the network it is associated with has no location capability or awareness of its own.

As mentioned previously, applications using the channel 104 may make requests for location information. For example, an API, getLocation(user), may be defined to determine the location of a user. The information provided to the API is in a form that is usable by an LBS application. Thus, devices having no location awareness can be located and applications requesting the information will receive timely and accurate information.

The accuracy of the information stored in the cache 106 may be also maintained over time to ensure accuracy and consistency. For example, when the user changes networks, the location information as is maintained within the SMLE 110 may be updated via user location information obtained from the new network and provided to the SMLE 110.

In another example of updating information, when the user switches devices from a cell phone to a Voice Over Internet Protocol (VoIP) service phone over broadband, the location information of the user moves with the user. The physical location known in the cellular domain is preserved in the data structure within the cache 106 after moving to the VoIP domain. For instance, a new estimate of location may be made after the change occurs.

Information may be obtained from the data structure without compromising the privacy of a user. For example, an application may obtain the location of the user without obtaining other information concerning the user. Thus, unauthorized users are prevented from compromising the privacy of others, and applications authorized only for user location are prevented from gaining other user information and consequently prevented from compromising the privacy of others.

In the architecture described above, the SMLE 110, from the perspective of the service entities, provides an aggregation point for location information. For example, in the WLAN mode, LBS applications can continue to receive location information from the SMLE 110 obtained via cellular location servers and RFID location servers. In a cellular mode of operation, the location accuracy may be enhanced by using the RFID location information to obtain more precise location estimates.

Figure 2:
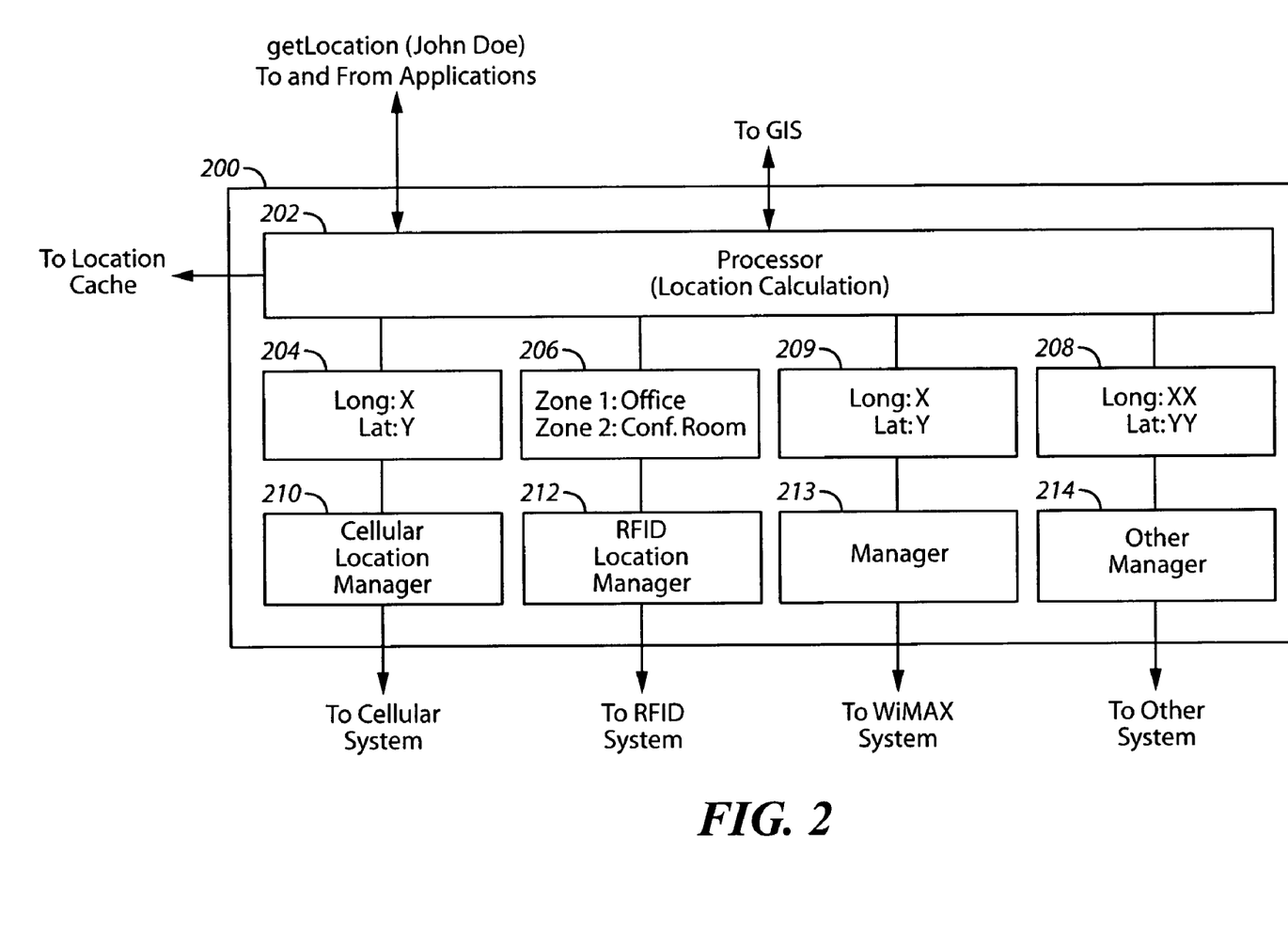
FIG. 2 is a block diagram of one example of a Seamless Measurement of Location Entity (SMLE) according to the present invention.

Referring now to FIG. 2, one example of a SMLE 200 is described. The SMLE 200 comprises a processor 202, a cellular location manager 210, a Radio Frequency Identifier (RFID) location manager 212, a WiMAX location manager 213, and an nth location manager 214. The actual number and types of location managers may vary based upon the needs of a particular system.

The cellular location manager 210 obtains location information 204, if available, from a cellular network and interfaces with a GIS application. The location information 204 may be of devices in and attached to the cellular network such as a base site or mobile phone. The RFID location manager 212 obtains pre-programmed or previously determined location information 206, if available, from an RFID system. The RFID system does not provide location on its own, but, in this example, it is assumed that location has been mapped to a set of fixed RFID devices, and this mapping could have been performed manually or through the approaches described herein. The WiMAX location manager 213 obtains location information 209, if available, from a WiMAX system. Finally, the nth location manager 214 obtains location information 208, if available, from some other type of system. The information 204, 206, 208, and 209 obtained by the managers is sent to the processor 202.

The processor 202 processes and maintains the information 204, 206, 208, and 209. The processor 202 derives other information from the gathered information and stores the resultant data structure in a cache (e.g., cache 106 of FIG. 1). For example, the processor 202 is programmed to gather location information, if available, related to a location-aware device received from managers 210, 212, 213, and 214 and to determine other location information for a location-unaware device from the location information from the location-aware device. For location-unaware devices or devices on networks having no location manager, the location of the location-unaware device is determined using information gathered about the location-aware devices or location aware networks and an association between the location-unaware device and the location-aware device or network.

As mentioned, the processor 202 creates a data structure (comprising a binding of the location information with device identifying information) and stores it in a cache. The data structure may be in a form that does not depend upon the type of an underlying network associated with any calling application, the device type, the device identity, or the identity of the user. The data structure includes identifying information of some entity such as a device, user, adjacent network, or other entity but may optionally exclude identifying information of the entity or entities from which location information is gathered.

Figure 3:
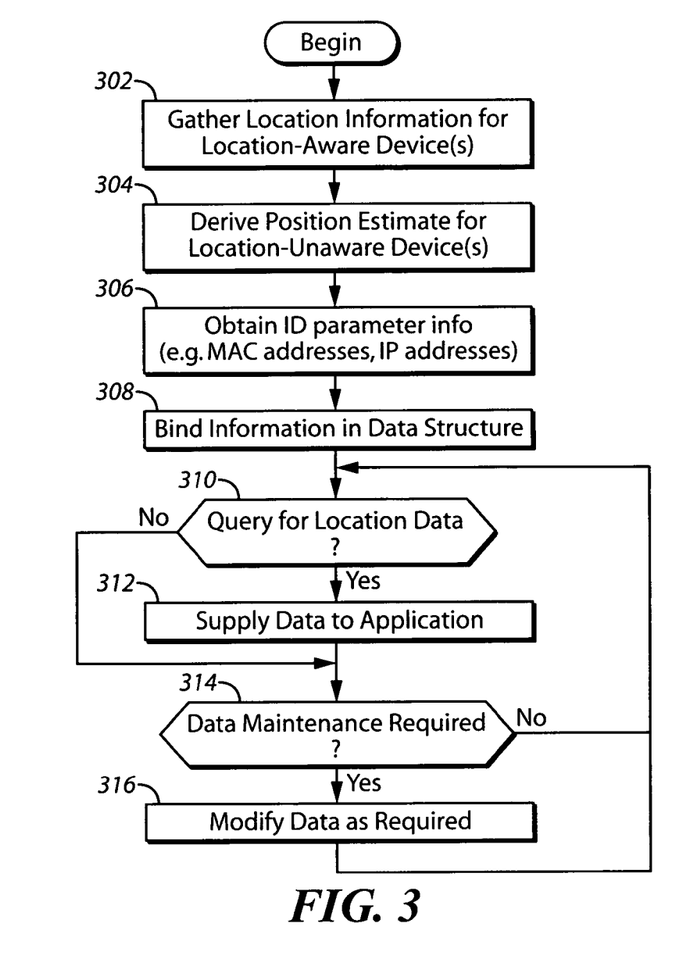
FIG. 3 is a flow chart of one example of an approach for providing and maintaining location information to applications according to the present invention.

Referring now to FIG. 3, one example of an approach for providing user or device location information to applications and maintaining this information is described. At step 302, location information is gathered from location-aware devices. For example, if a location-aware device is in a cellular network, the location of the device may be determined by triangulation or other techniques that are known in the art.

At step 304, a position estimate is derived for a location-unaware device using the location information gathered concerning the location-aware device and an association of some form as previously described. For example, the location of a location-unaware device (e.g., an access point) may be derived from information from a location-aware device (e.g., a multi-mode handset). Consequently, the location of the location-unaware device may be derived from the already gathered information. At step 306, device identifying parameters are gathered for the devices. For example, a Media Access Control (MAC) address, an Internet Protocol (IP) address, a Universal Resource Identifier (URI), or a telephone number may be obtained. At step 308, the derived location information and identifying parameter (from step 306) are bound together in the data structure for later use.

At step 310, it is determined if a query has been received for the location of a user. If the answer is negative, execution continues at step 314. If the answer is affirmative, then at step 312, data is obtained from the database to answer the query. In one example, an API may be used to query the database and request a user location. This query may be for a location of an access point, or in another approach, the query may be for a device connected to the access point. Other examples of queries are possible.

At step 314, it is determined if maintenance of the location information is required. For instance, a device may move between networks, within a network, or change registration status. If the answer at step 314 is negative, execution continues with step 310 as described above. If the answer is affirmative, control continues with step 316 where the data is updated. For example, a location update may be performed to determine the location where the device is present with the highest certainty. Updates may refine the location information to keep the information up-to-date or refine the information to gain more accuracy. Execution then continues with step 310 as described above.

Figure 4:
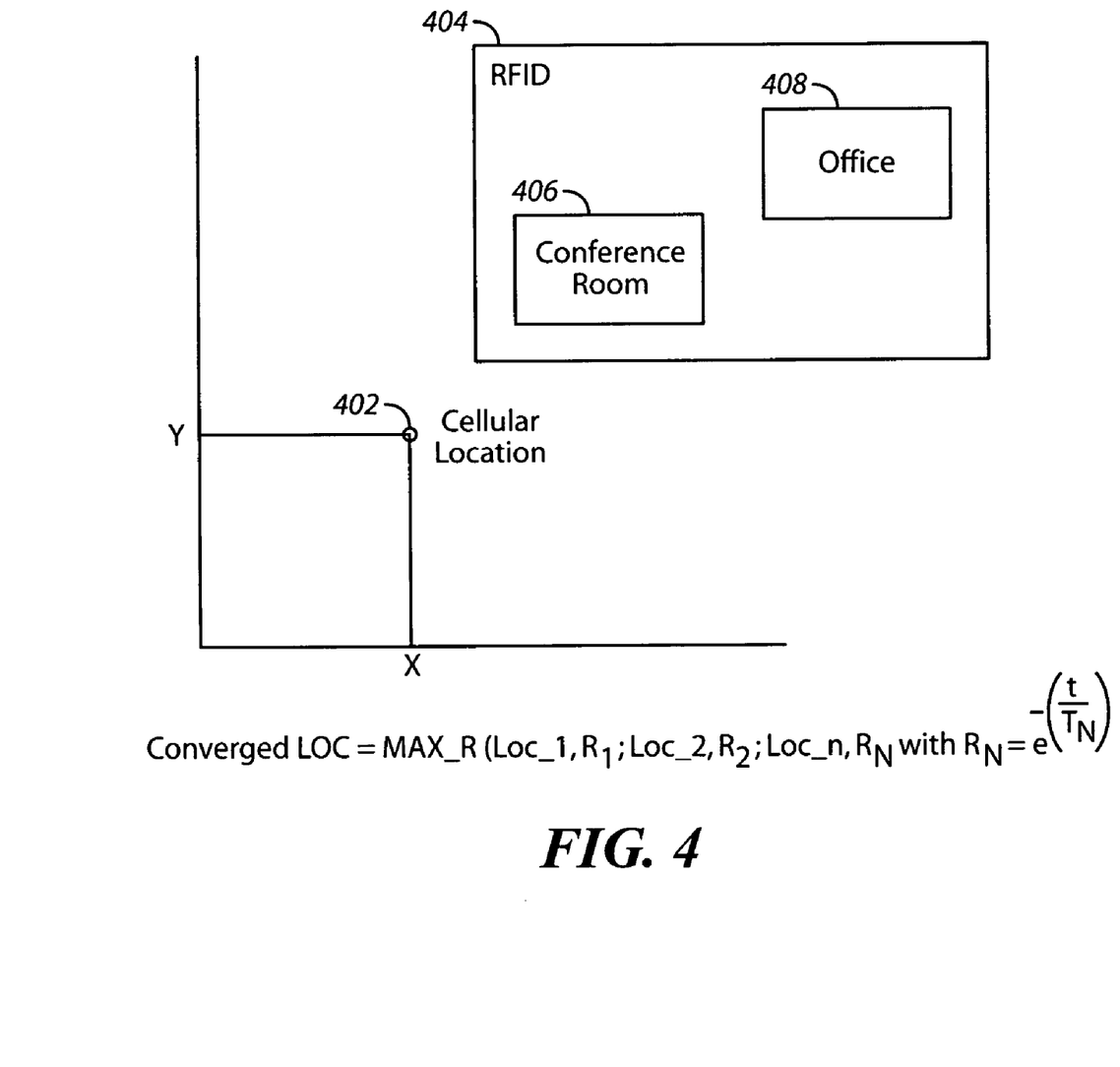
FIG. 4 is a diagram showing one example of a system that dynamically updates location information in a database according to the present invention.

Referring now to FIG. 4, one example of updating a user location within a data structure is described. In this example, a client device is initially at a cellular location 402 and moves to an RFID network 404, which has a conference room location 406 and an office location 408.

The converged location is given by a function such as MAX_R(Loc_1, R1; Loc_2, R2; Loc_N, RN). In this function, Loc_N is a location. Loc_N may be a distinct measurement, or may be a combination of a current measurement with previous measurements. RN is proportional to $e^{-t/TN}$ and is the reliability index for the location information from network n. TN is a freshness factor for the network or device N. The parameter t is the time elapsed since the last valid location update in the location cache. The function MAX_R gives the location of the device with the highest reliability index and may be periodically applied to stored location information associated with a client device to ensure the freshness and accuracy of the information. It will be appreciated that variants and entirely different functions are possible and depending upon the desired use. It will also be appreciated that modifications to collected measurements can be made, such as deleting a {Loc_i, Ri} pair made obsolete due to a subsequent measurement that takes place.

In one example of performing a location update associated with the system shown in FIG. 4, when a user at a client device is operating at point 402 within the cellular network, a location request generates a new cellular location update (t=0). While fresh location information from the other networks is not available, the cached location information has to be used instead (t>0). In the calculation of location, the cellular location has the highest reliability and is picked as the location of the user and is stored in the cache.

In another example, when the user operates within the RFID network 404, a location request by an application generates a new RFID location update (t=0). Fresh location information data from other networks is not available and cached location information has to be used instead (t>0). In the location calculation, the RFID location has the highest reliability and is picked as the location of the user and stored in the cache.

Figure 5:
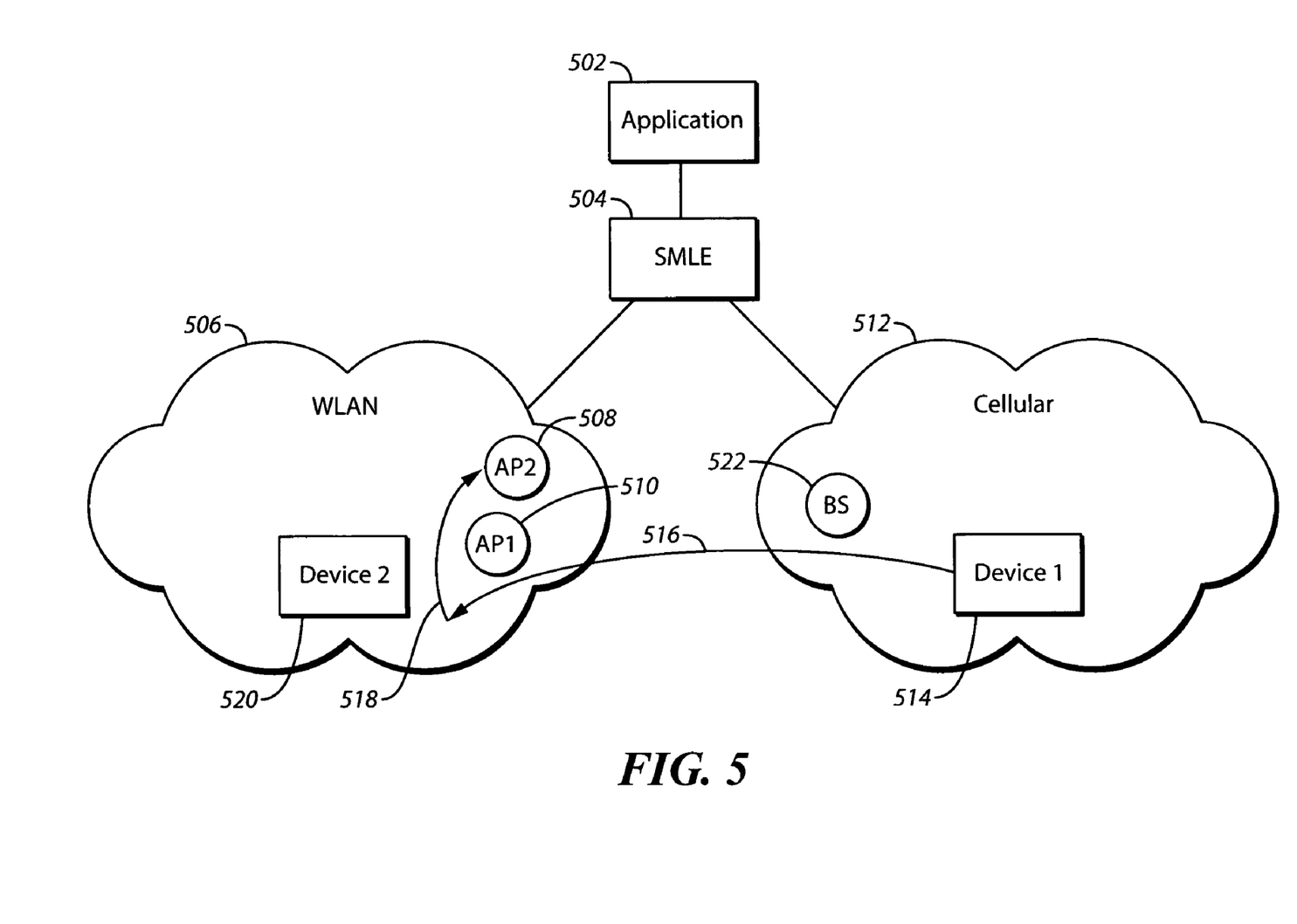
FIG. 5 is a block diagram of one example of a system for providing and maintaining location information to applications according to the present invention.

Referring now to FIG. 5, one example of a system for determining and maintaining location information is described. The system includes an application 502, SMLE 504, a WLAN 506, and a cellular network 512. The cellular network 512 includes a base station 522 and a location-aware device 514. The WLAN 506 comprises a first access point (AP1) 510 and a second access point (AP2) 508. The network 506 also includes a location-unaware device 520.

The SMLE 504 gathers and maintains location information about location-aware and location-unaware devices 514 and 520 as described above. The application 502 may be any application that requires location information to enable its functioning. The access points 508 and 510 are switching devices that enable communications amongst devices that move within the network 506.

Referring now to FIGS. 6-9, one example of the changes made to a data structure over time is described in relation to the system shown in FIG. 5. It will be understood that the tools (e.g., programming language and programming data structure) used to implement the actual bindings and data structure may vary based upon the needs of the system and other factors.

These figures illustrate how a data structure changes over time and as client devices move within the system. Specifically, these figures illustrate an initial data structure (FIG. 6); the data structure after the location-aware device 514 moves from the cellular network 512 to the WLAN 506 (FIG. 7); the data structure after the location-unaware device 520 becomes associated with the access point 510; and the data structure after the location-aware device 514 moves to the second access point 508. Other examples are possible. Location information can be gathered as a device transits between a location-unaware network or mode and a location-aware network or mode in either direction (entering or leaving the location-aware network or mode). Further, a transition does not need to be instant to provide a useable association. For instance, a registration released from a WLAN access point followed by a registration made with a cellular base station a short time later can still imply physical proximity.

Figure 6:
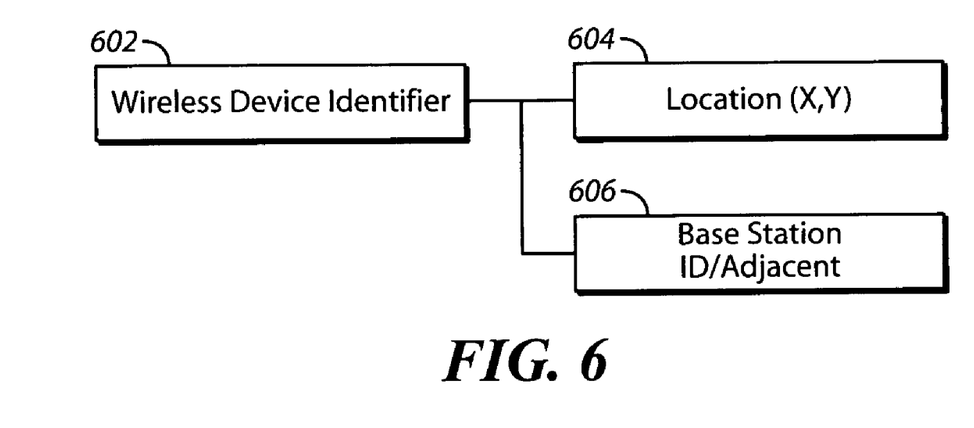
FIG. 6 is a block diagram of an initial data structure related to the system of FIG. 5 according to the present invention.

As stated, FIG. 6 shows an initial data structure with the location-aware device 514 being in the cellular network 512. In this case, an identifier 602 represents an identifier of the location-aware device 514 within the network 512. The identifier 602 is linked to location information 604 and a base station identifier 606. The base station identifier 606 identifies the base station 522 that is currently serving the device 514.

Figure 7:
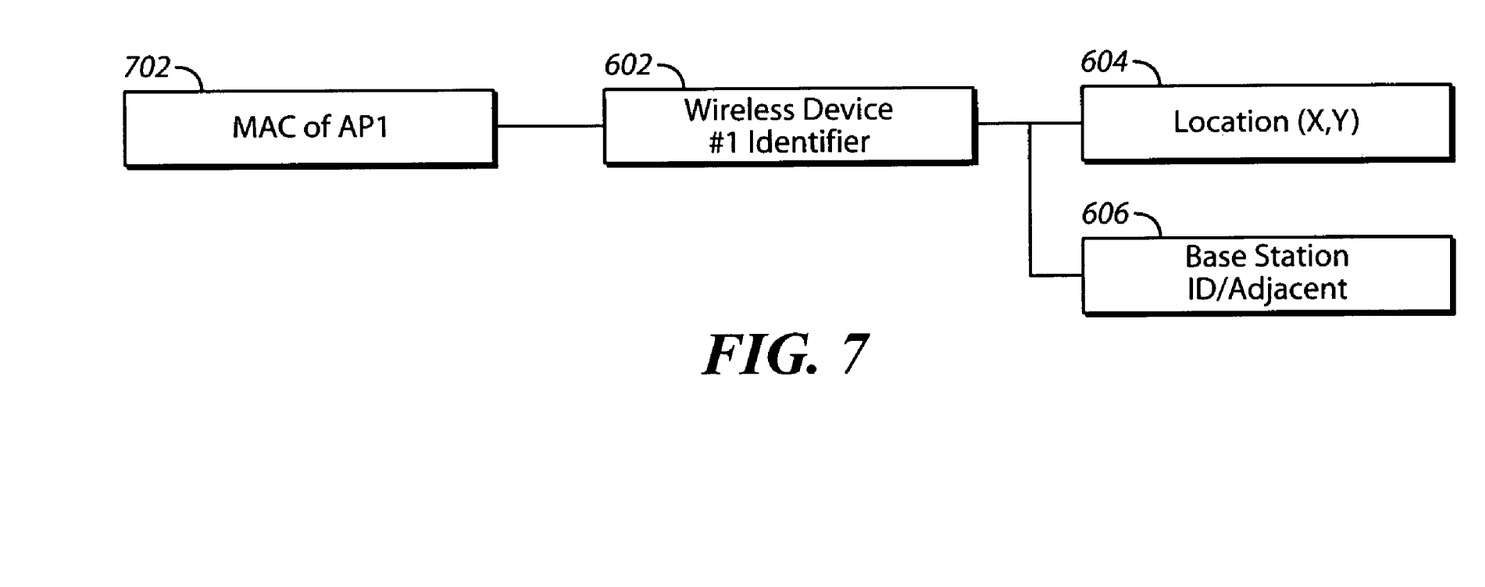
FIG. 7 is a block diagram of the data structure related to the system of FIG. 5 after the first client device 504 moves from the cellular network 512 to the WLAN 506 according to the present invention.

Next, FIG. 7 shows the data structure after the location-aware device 514 has moved from the cellular network 512 to the WLAN 506 and becomes associated with the access point 510. In this case, an identifier 702 is created. The identifier 702 may be, in one example, the MAC address of the access point 510. The identifier 702 is bound to the identifier 602 (of the first client device 514), location information 604, and base station identifier 606. Additionally, the base station identifier 606 may be tagged with information identifying it as being near or adjacent to access point 510, even though the base station 522 and access point 510 cannot interact directly. Consequently, a mapping of the access point 510 and base station 522 across networks 506 and 512 has been created and may be used in the future to locate other devices or for other purposes.

The actual values contained within any of the elements 602, 604, and 606 may change or have been updated since the element values were first determined. Further, although elements 604 and 606 may now be bound to element 702, the client device identifier 602 may optionally be excluded from this binding, excluded from API responses, or replaced with a more anonymous value to preserve device or user privacy.

Figure 8:
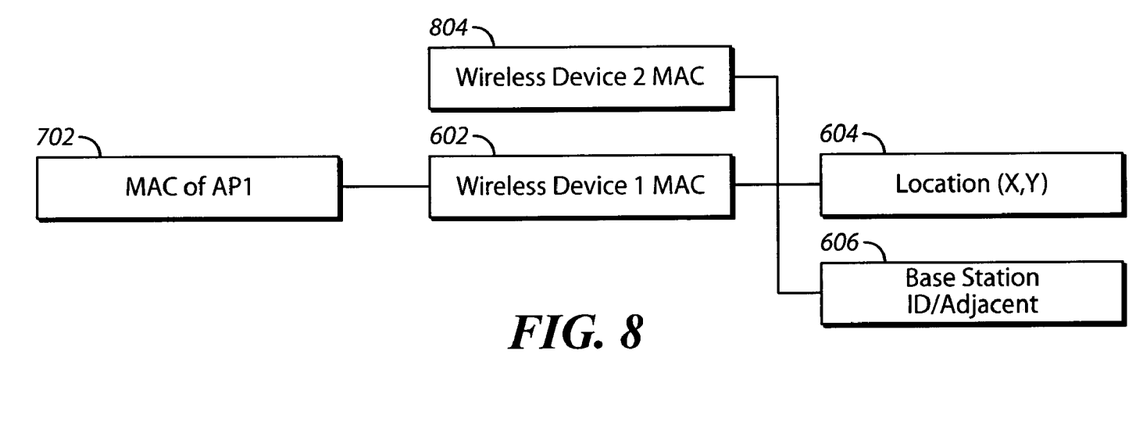
FIG. 8 is a block diagram of the data structure related to the system of FIG. 5 after the second client device 520 becomes associated with the WLAN 506 according to the present invention.

Thereafter, FIG. 8 shows the data structure after the location-unaware device 520 becomes associated with the access point 510. In this case, an identifier 804 is created and bound to the identifier 702 (of the access point 510), identifier 602 (of the first client device 514), location information 604, and base station identifier 606. As before, the actual values contained within any of the elements may have changed or have been updated. Further, as before, the client device identifiers 602 and 804 may be optionally excluded from this binding, excluded from API responses, or replaced with more anonymous values to preserve device or user privacy. Because of the binding, the location of the second client device 520 may now be determined using information previously gathered from the location-aware device 514. In one example, this binding may take the form of a data structure (not shown) corresponding to the second client device 520 that is created specifically for the second client device 520.

Figure 9:
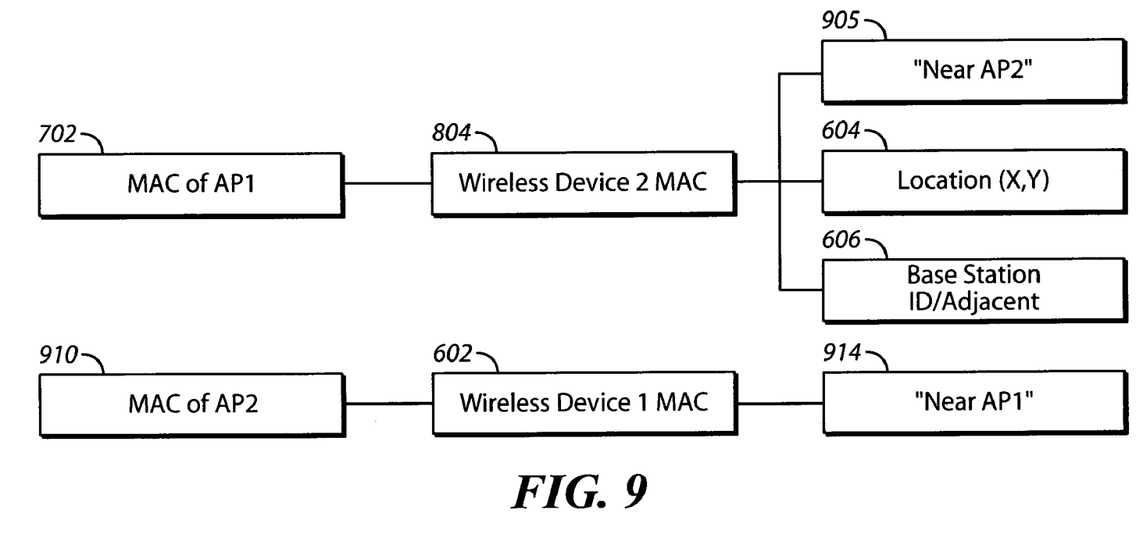
FIG. 9 is a block diagram of the data structure related to the system of FIG. 5 after the first device 514 moves within the WLAN 506 according to the present invention.

Finally, FIG. 9 shows the data structure after the location-aware device 514 moves to the second access point 508. In this case, an identifier 910 (of the second access point) is created and bound to the identifier 602 (of the location-aware device). An informational element 914 (which indicates that the second access point 508 is near the first access point 510) is also created and bound to this information.

Separately, the identifier 702 (of the first access point) is created and bound to the identifier 804 (of the second access point), location information 604, and base station information 606. An informational element 905 is also bound to these elements and indicates that the first access point 510 is near the second access point 508. Consequently, a mapping of the access points 508 and 510 within the network 506 has been created and may be used in the future to locate other devices or for other purposes. At this point, having associated with the second access point 508 in place of the first access point 510, the location-aware device identifier 602 has also been unbound or released from the data structure of the first access point 510, and no longer appears in this structure.

Thus, approaches are provided that allow multiple types of networks to be seamlessly connected, providing convergence from the perspective of the user and the service provider. In addition, the SMLE described herein provides a service to applications and application developers in the form of an intelligent and unified database coupled to an API, allowing for highly-portable applications with a greater depth of features. The SMLE also enables an application to operate over multiple networks and with different types of devices. Moreover, location information can be obtained and used by end-users without giving away their identity to untrusted parties. Further, while it may be centralized or distributed in implementation, the SMLE provides a single functional point for location information storage and processing, thereby promoting network efficiencies.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of determining location information about entities comprising:

operating a location-unaware entity in a location-unaware network at a first geographic position, the location-unaware entity having no direct awareness of operating at the first geographic position;

operating a location-aware entity in a location-aware network at a second geographic position, the location-aware entity being directly aware of operating at the second geographic position;

transmitting information indicating the second geographic position from the location-aware entity operating in the location-aware network to the location-unaware entity operating in the location-unaware network; and at the location-unaware entity, receiving the transmitted information and determining the first geographic position from the transmitted information.

2. The method of claim 1 further comprising using the first geographic position to determine the location of a third location-unaware entity.

3. The method of claim 1 further comprising determining adjacency information concerning at least two entities selected from the group comprising: the location-aware entity, the location-unaware entity, and a third entity using at least in part the first geographic position.

4. The method of claim 1 wherein the location-unaware entity is in an administrative domain substantially different from an administrative domain of the location-aware network.

5. The method of claim 1 wherein the location-aware entity is a multi-mode device, which is capable of communication with multiple networks.

6. The method of claim 1 wherein determining the first geographic position comprises determining the first geographic position as an estimate of an access point location.

7. The method of claim 1 wherein determining the first geographic position comprises determining the first geographic position from at least one device selected from a group comprising the location-aware entity and a network server that has location information concerning the location-aware entity.

8. The method of claim 1 further comprising updating the first geographic position.

9. The method of claim 1 wherein the location-unaware entity is selected from a group comprising a mobile device, a network access point, a mobile router, a subnet prefix, an ad-hoc network, a stationary network, and a moving network.

* * * * *